US012657078B2

(12) United States Patent
Yan et al.

(10) Patent No.: US 12,657,078 B2
(45) Date of Patent: Jun. 16, 2026

(54) COPROCESSOR, HOST PROCESSOR, CRASH DETECTION METHOD AND ELECTRONIC DEVICE

(71) Applicant: Beijing Youzhuju Network Technology Co., Ltd., Beijing (CN)

(72) Inventors: Ligen Yan, Beijing (CN); Shijian Ge, Beijing (CN); Zihao Lv, Beijing (CN); Liang Peng, Beijing (CN); Yu Zhang, Beijing (CN); Jian Wang, Beijing (CN); Haitao Nie, Beijing (CN); Chenchen Li, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/417,955

(22) Filed: Jan. 19, 2024

(65) Prior Publication Data

US 2024/0256373 A1     Aug. 1, 2024

(30) Foreign Application Priority Data

Jan. 29, 2023   (CN) .......................... 202310103009.4

(51) Int. Cl.
*G06F 11/00*          (2006.01)
*G06F 11/07*          (2006.01)
*G06F 11/22*          (2006.01)
(52) U.S. Cl.
CPC ...... *G06F 11/0751* (2013.01); *G06F 11/0724* (2013.01); *G06F 11/0757* (2013.01); *G06F 11/0772* (2013.01); *G06F 11/2242* (2013.01)
(58) Field of Classification Search
CPC ............. G06F 11/0751; G06F 11/0724; G06F 11/0757; G06F 11/0772; G06F 11/2242
See application file for complete search history.

(56) References Cited

U.S. PATENT DOCUMENTS 6,389,568 B1    5/2002  Leshay et al.
9,485,163 B1 *  11/2016  Fries ..................... G06F 11/203
(Continued)

FOREIGN PATENT DOCUMENTS

CN          102136921 A      7/2011
CN          104506392 A      4/2015
(Continued)

OTHER PUBLICATIONS

International Search Report, International Patent Application No. PCT/CN2024/071883, Apr. 10, 2024, with English translation of Search Report (7 pages).

*Primary Examiner* — Elmira Mehrmanesh
(74) *Attorney, Agent, or Firm* — Astute IP Law Group

(57)                ABSTRACT

Embodiments of the present disclosure relate to a coprocessor, a host processor, a crash detection method and an electronic device. In this method, the coprocessor sends a handshake request to the host processor capable of running an operating system. The host processor performs an operation triggered by the handshake request. The host processor sends a positive response to the handshake request to the coprocessor if the operation is performed successfully; and the host processor sends, to the coprocessor, a negative response to the handshake request or no response if the operation is performed successfully. The coprocessor monitors a response to the handshake request from the host processor and determines a detection result of hardware crash associated with the operating system at least based on a monitoring result of this response.

18 Claims, 8 Drawing Sheets

(56)     References Cited

U.S. PATENT DOCUMENTS

| | | | | |
|---|---|---|---|---|
| 2012/0089861 A1* | 4/2012 | Cardinell | ............ | G06F 11/0757 |
| | | | | 714/E11.003 |
| 2014/0208152 A1* | 7/2014 | Magoshi | ............... | H04L 69/163 |
| | | | | 714/4.1 |
| 2019/0020724 A1* | 1/2019 | Castil | .................... | H04L 67/141 |
| 2019/0280760 A1* | 9/2019 | Xu | ........................ | H04W 76/45 |
| 2022/0027190 A1* | 1/2022 | Hay | ....................... | G06F 9/5077 |
| 2022/0103397 A1* | 3/2022 | Fung | ....................... | H04L 12/12 |
| 2023/0171834 A1* | 6/2023 | Nakano | ................. | H04W 76/18 |
| | | | | 370/328 |
| 2023/0205287 A1* | 6/2023 | Jiang | ................... | G06F 9/45558 |
| | | | | 713/1 |

FOREIGN PATENT DOCUMENTS

| | | |
|---|---|---|
| CN | 205263795 U | 5/2016 |
| CN | 106982148 A | 7/2017 |
| CN | 110659500 A | 1/2020 |
| CN | 113176493 A | 7/2021 |
| CN | 115561617 A | 1/2023 |
| JP | H10133963 A | 5/1998 |

* cited by examiner

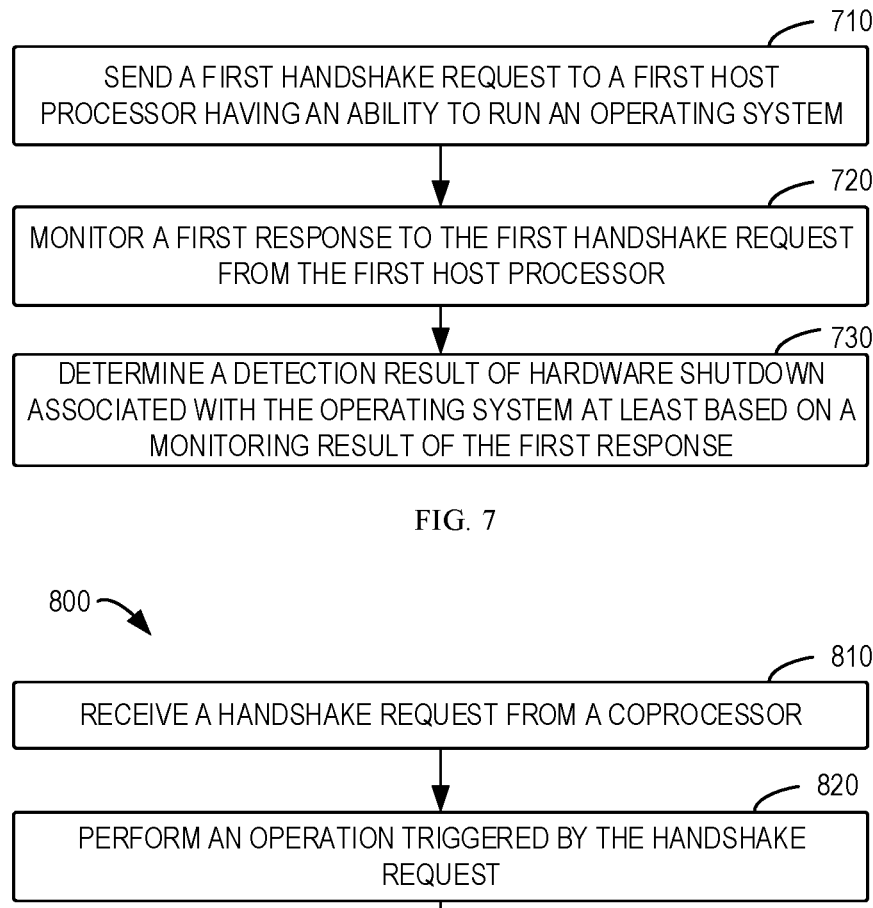

700 ⌐

710

SEND A FIRST HANDSHAKE REQUEST TO A FIRST HOST PROCESSOR HAVING AN ABILITY TO RUN AN OPERATING SYSTEM

720

MONITOR A FIRST RESPONSE TO THE FIRST HANDSHAKE REQUEST FROM THE FIRST HOST PROCESSOR

730

DETERMINE A DETECTION RESULT OF HARDWARE SHUTDOWN ASSOCIATED WITH THE OPERATING SYSTEM AT LEAST BASED ON A MONITORING RESULT OF THE FIRST RESPONSE

RECEIVE A HANDSHAKE REQUEST FROM A COPROCESSOR

820

PERFORM AN OPERATION TRIGGERED BY THE HANDSHAKE REQUEST

830

SEND, BASED ON A RESULT OF THE OPERATION, A RESPONSE TO THE HANDSHAKE REQUEST TO THE COPROCESSOR FOR DETECTING HARDWARE CRASH ASSOCIATED WITH AN OPERATING SYSTEM

FIG. 8

COPROCESSOR, HOST PROCESSOR, CRASH DETECTION METHOD AND ELECTRONIC DEVICE

CROSS REFERENCE

The present application claims priority to Chinese Patent Application No. 202310103009.4, filed on Jan. 29, 2023, and entitled "coprocessor, host processor, crash detection method and electronic device", the entirety of which is incorporated herein by reference.

FIELD

Example embodiments of the present disclosure generally relate to the field of computers, and in particular to a coprocessor, a host processor, a crash detection method and an electronic device.

BACKGROUND

With the development of information technologies, various processors having an ability to run operating systems may be applied to a variety of scenarios. Crash refers to a phenomenon that the operating system fails to recover from a critical system error or a system hardware level goes wrong such that the system is unresponsive for a long time and the computer has to be restarted. Depending on the cause of crash, the crash may include software crash and hardware crash. It is expected that the crash can be detected accurately.

SUMMARY

In a first aspect of the present disclosure, a coprocessor is provided. The coprocessor includes: at least one circuit configured to: send a first handshake request to a first host processor having an ability to run an operating system; monitor a first response to the first handshake request from the first host processor; and determine a detection result of hardware crash associated with the operating system at least based on a monitoring result of the first response.

In a second aspect of the present disclosure, a host processor is provided. The host processor has an ability to run an operating system and includes: at least one circuit configured to: receive a handshake request from a coprocessor; perform an operation triggered by the handshake request; and send, based on a result of the operation, a response to the handshake request to the coprocessor for detecting hardware crash associated with the operating system.

In a third aspect of the present disclosure, a crash detection method is provided. The method includes: sending by a coprocessor a first handshake request to a first host processor having an ability to run an operating system; monitoring a first response to the first handshake request from the first host processor; and determining a detection result of hardware crash associated with the operating system at least based on a monitoring result of the first response.

In a fourth aspect of the present disclosure, a crash detection method is provided. The method includes: receiving by a host processor a handshake request from a coprocessor; performing an operation triggered by the handshake request; and sending, based on a result of the operation, a response to the handshake request to the coprocessor for detecting hardware crash associated with the operating system.

In a fifth aspect of the present disclosure, an electronic device is provided. The electronic device at least includes the coprocessor in the first aspect, and at least one host processor in the second aspect.

In a sixth aspect of the present disclosure, a computer-readable storage medium is provided. The computer-readable storage medium stores a computer program thereon, wherein the computer program, when being executed by a coprocessor, implements the method in the third aspect.

In a seventh aspect of the present disclosure, a computer-readable storage medium is provided. The computer-readable storage medium stores a computer program thereon, wherein the computer program, when being executed by a host processor, implements the method in the fourth aspect.

It should be understood that the content described in this Summary section is neither intended to limit the key features or important features of the embodiments in the present disclosure, nor is it intended to limit the scope of the present disclosure. Other features of the present disclosure will be readily understood through the following description.

BRIEF DESCRIPTION OF THE SEVERAL VIEWS OF THE DRAWINGS

The above and other features, advantages and aspects of various embodiments of the present disclosure will become more apparent in conjunction with the accompanying drawings and with reference to the following detailed description. In the accompanying drawings, the same or similar reference numerals represent the same or similar elements, where:

FIG. 7 illustrates a flowchart of a process for crash detection implemented at a coprocessor according to some embodiments of the present disclosure;

FIG. 8 illustrates a flowchart of a process for crash detection implemented at a host processor according to some embodiments of the present disclosure.

DETAILED DESCRIPTION

Figure 1:
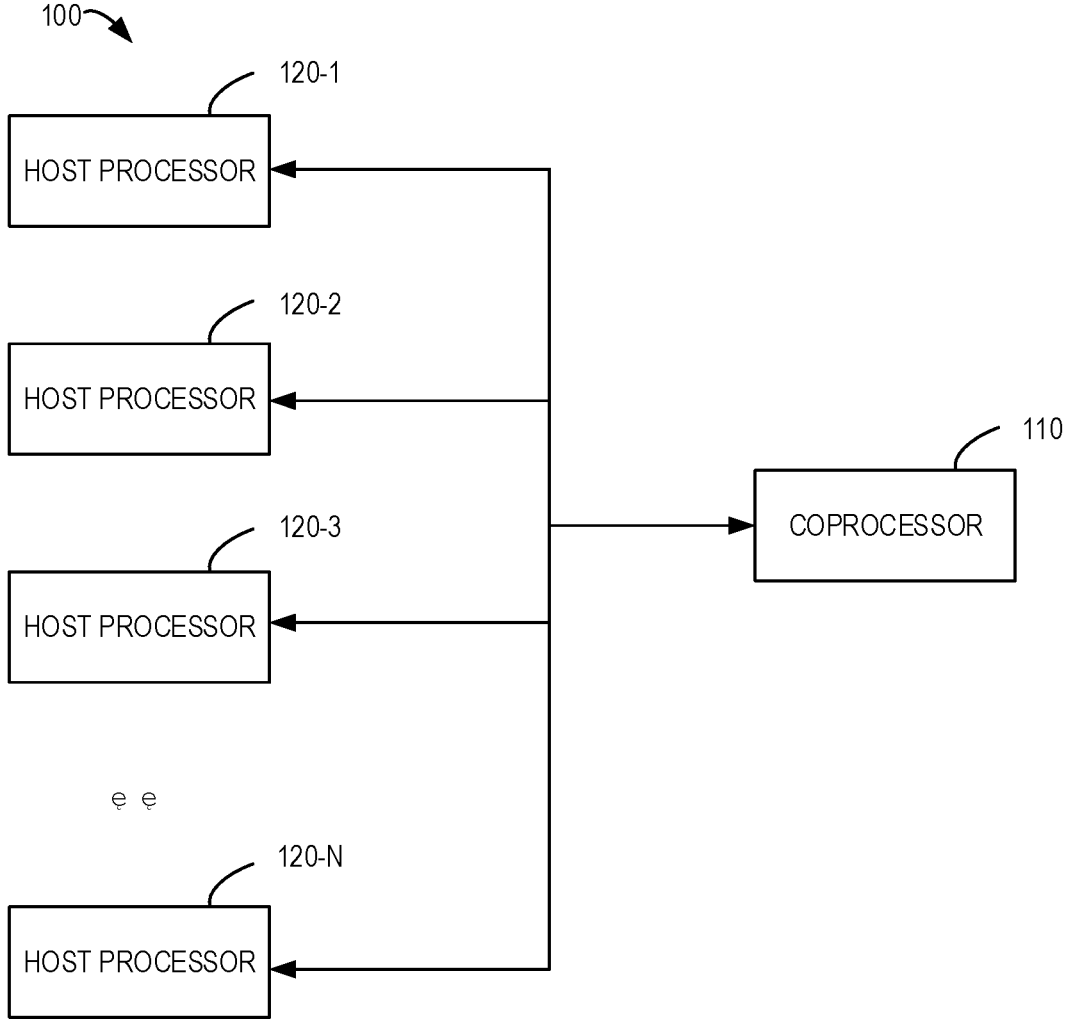
FIG. 1 illustrates a schematic diagram of an example environment in which embodiments of the present disclosure can be implemented.

The embodiments of the present disclosure are described in detail below with reference to the accompanying drawings. Although some embodiments of the present disclosure are shown in the drawings, it should be understood that the present disclosure may be implemented in various forms and should not be construed as being limited to the embodiments described herein. Rather, these embodiments are provided for a more thorough and complete understanding of the present disclosure. It should be understood that the accompanying drawings and embodiments of the present disclosure are only used for the purpose of illustration, but not to limit the protection scope of the present disclosure.

In the description of the embodiments of the present disclosure, the term "including" and its similar terms shall be understood as open-ended inclusion, i.e., "including but not limited to". The term "based on" should be understood as "at least partially based on". The terms "one embodiment" or "this embodiment" should be understood as "at least one embodiment". The term "some embodiments" should be understood as "at least some embodiments". Other explicit and implicit definitions may also be included below. The terms "first", "second", etc., may refer to different or identical objects. Other explicit and implicit definitions may also be included below.

The embodiments of the present disclosure may involve user data, acquisition and/or use of data, etc. These aspects are in accordance with the corresponding laws and regulations and relevant provisions. In the embodiments of the present disclosure, the collection, acquisition, handling, processing, forwarding, use, etc. of all data are carried out with the knowledge and confirmation of a user. Accordingly, when implementing various embodiments of the present disclosure, the user shall be appropriately informed of the type, scope of use, and usage scenarios of the data or information that may be involved in accordance with relevant laws and regulations to obtain the user's authorization. The specific informing and/or authorization method may vary according to the actual situations and application scenarios, and the scope of the present disclosure is not limited in this regard.

If the schemes described in this specification and embodiments involve the processing of personal information, they will be processed on a lawful basis (e.g., obtaining the consent from a personal information subject, or necessary for the performance of a contract, etc.), and the processing will only be carried out within the scope of provisions or agreements. If the user refuses to process personal information other than the information necessary for the basic functions, the basic functions in use of the user will not be affected.

As briefly mentioned above, an operating system may sometimes be crashed. Traditionally, one crash detection scheme is a way to manually view if the operating system runs normally. However, the labor cost required for this scheme is too high and it is impossible to detect hardware crash. With the development of technologies, a software crash detection scheme has emerged. Software crash detection deployed at the operating system level (e.g., based on ping access detection) is used to determine whether the operating system is in a crash state. Specifically, when the operating system fails to respond to a ping command given by a detection device, it can be concluded that the operating system is in the crash state. However, software crash detection is affected by a number of other factors. For example, when the detection device is in an unstable network connection state or when the operating system is executing an emergency event, the operating system cannot respond to the ping command given by the detection device. In this case, the operating system is mistakenly detected as being in a crash state, i.e., pseudo crash. Therefore, the software crash detection scheme cannot achieve real-time detection, and pseudo crash may occur. Restart of a device due to pseudo crash may result in a huge loss. These traditional schemes do not allow for hardware crash detection.

Embodiments of the present disclosure provide a crash detection scheme. According to the embodiments of the present disclosure, a coprocessor performs a handshake to a host processor running an operating system to achieve hardware crash detection. Specifically, the coprocessor sends a handshake request to the host processor. The host processor performs an operation triggered by performing the handshake request in response to the handshake request. Depending on the execution situation of the operation, the host processor sends a response to the coprocessor or does not respond to the coprocessor. The coprocessor monitors the response from the host processor and determines a detection result of hardware crash associated with the operating system according to a monitoring result.

In the embodiments of the present disclosure, the interaction between the host processor and the coprocessor within the same device (e.g., the same chip) may be used to realize hardware crash detection. In this way, accurate and reliable hardware crash detection can be achieved advantageously.

Example Environment and Handshake Mechanism

FIG. 1 illustrates a schematic diagram of an example environment 100 in which embodiments of the present disclosure can be implemented. As shown in FIG. 1, the environment 100 may include a coprocessor 110 and at least one processor, such as host processors 120-1, 120-2, 120-3, . . . , 120-N, which are also referred to collectively or individually as a host processor 120, where N is a positive integer greater than or equal to 1.

The host processor 120 may include any appropriate type of processor, including, but not limited to, one or a combination of more of a central processing unit, an image processor, a neural network processor, and a baseband chip. In the embodiments of the present disclosure, the host processor 120 has an ability to run an operating system, that is, is capable of running an operating system. Specifically, each host processor 120 is capable of running the operating system independently. The host processor 120 includes at least one circuit, the at least one circuit being configured to perform operations described below with respect to the host processor. For example, the at least one circuit is configured to receive a handshake request sent by the coprocessor 110 and perform corresponding operations, and send a response to the handshake request to the coprocessor 110.

The coprocessor 110 may assist the host processor 120 in completing processing tasks that the host processor 120 cannot perform or perform with low efficiency and low effects, such as signal transmission between devices, management of access devices, graphics processing, and audio processing. The coprocessor 110 may also interact with the host processor 120. In the embodiments of the present disclosure, the coprocessor 110 includes at least one circuit, the at least one circuit being configured to perform the operations described below with respect to the coprocessor. For example, the at least one circuit is configured to send a handshake request to the host processor 120; and determine a detection result of hardware crash associated with the operating system according to a monitoring result of a response from the host processor 120.

In the embodiments of the present disclosure, the coprocessor 110 may communicate with the host processor 120 via any appropriate connection. In some embodiments, a communication connection may be established between the coprocessor 110 and the host processor 120 through a shared memory communication mechanism, a Mailbox hardware communication mechanism, a DMA data handling communication mechanism, a serial port master-slave mode communication mechanism, a hard-wired connection mode, etc. The coprocessor 110 and the host processor 120 can achieve signaling interaction through the communication connection established therebetween. It should be understood that the host processor 120 and the coprocessor 110 may be implemented in the same electronic device, e.g. within the same chip. Compared with a situation where it needs a network or to use a network card to achieve communication, in this case, the interference factors of communication between the host processor 120 and the coprocessor 110 are greatly reduced and thus the communication is more reliable. This facilitates the correct detection of hardware crash.

In some embodiments, the electronic device may include a coprocessor 110 and at least one host processor 120. Additionally, in some embodiments, the electronic device may include an interrupt controller.

In some embodiments, the handshake request sent by the coprocessor 110 may include an interrupt signal for triggering the host processor 120 to perform interrupt processing. In such an embodiment, the environment 100 may also include an interrupt controller. The coprocessor 110 may send a handshake request to the interrupt controller, which in turn forwards the handshake request to the host processor 120.

In some embodiments, the interrupt controller may set a handshake request for crash detection from the coprocessor 110 as an interrupt signal with the highest priority. That is, when receiving a plurality of interrupt signals, the interrupt controller may preferentially forward the handshake request to the host processor 120.

In some embodiments, the interrupt controller may control which of the plurality of host processors 120 the handshake request from the coprocessor 110 is forwarded to. For example, in the case of an interrupt processing task run by the host processor 120-1, the interrupt controller may forward the handshake request to the host processor 120-1. For example, in the case of an interrupt processing task run by the host processor 120-2, the interrupt controller may forward the handshake request to the host processor 120-2.

It should be understood that the structure and function of the environment 100 are described for an illustrative purpose only and do not imply any limitation on the scope of the present disclosure.

Figure 2:
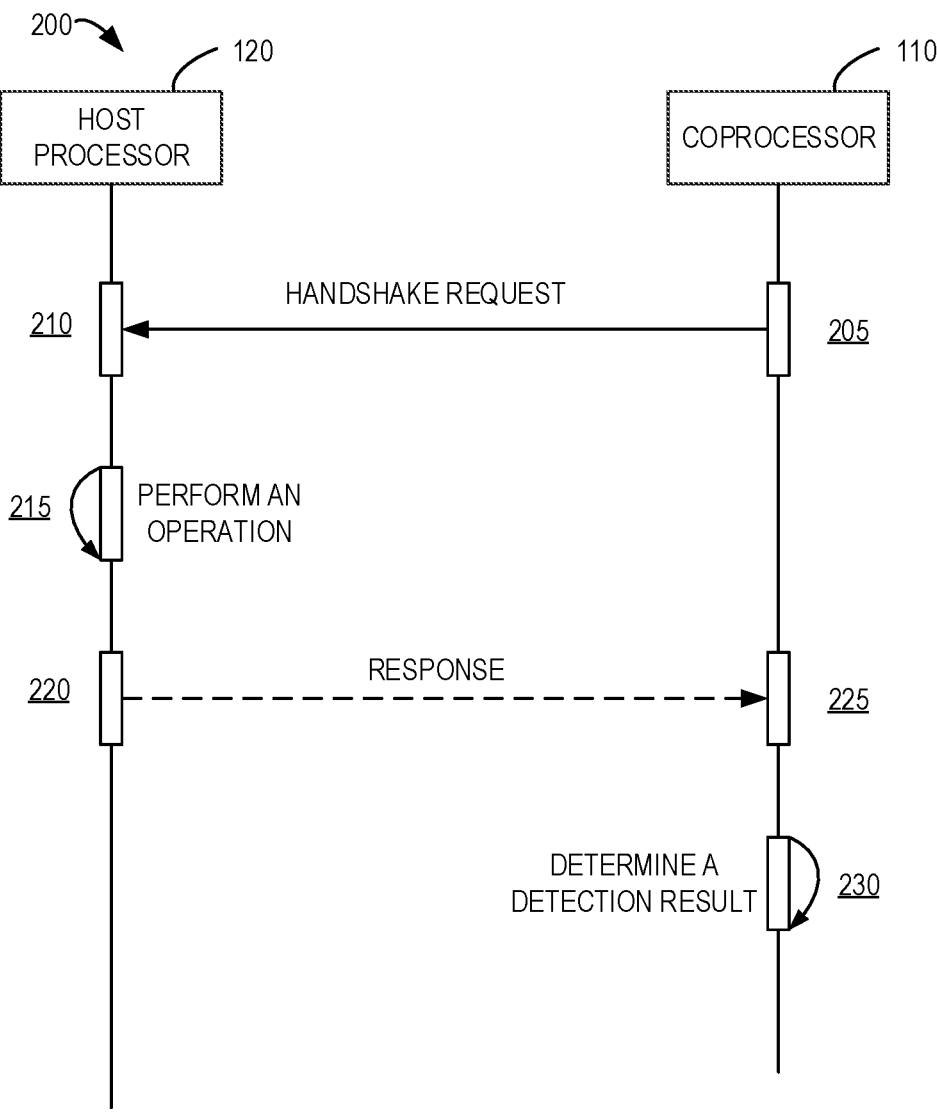
FIG. 2 illustrates a schematic diagram of a signaling stream for crash detection according to an embodiment of the present disclosure.

FIG. 2 illustrates a schematic diagram of a signaling stream 200 for crash detection according to an embodiment of the present disclosure. The signaling stream 200 involves a coprocessor 110 and a host processor 120 in an environment 100. The host processor 120 may be any one of the host processors 120-1, 120-2, 120-3, . . . , 120-N shown in FIG. 1.

In the signaling stream 200, the coprocessor 110 sends (205) a handshake request to the host processor 120. The handshake request may be configured to trigger the host processor to perform one or more operations. In some embodiments, the handshake request may be configured to trigger the host processor 120 to perform interrupt processing. Alternatively or additionally, the handshake request may be configured to determine whether the host processor 120 has a program, operation, thread, process, instruction, etc., being executed.

The handshake request may be sent periodically or regularly. For example, the coprocessor 110 may send a handshake request regularly to the host processor 120 through a timer or by starting a task mechanism. The coprocessor 110 may send a handshake request to the host processor 120 through a direct connection between the coprocessor 110 and the host processor 120, or may forward the handshake request to the host processor through a controller (e.g., an interrupt controller).

Correspondingly, the host processor 120 receives (210) the handshake request from the coprocessor 110 either directly or by forwarding. The host processor 120 performs (215) an operation triggered by this handshake request. In some embodiments, if the handshake request includes an interrupt signal for triggering the host processor 120 to perform interrupt processing, the host processor 120 may temporarily interrupt an operation currently being performed and turn to process the interrupt signal after receiving the handshake request. In other words, after receiving the handshake request, the host processor 120 may enter a corresponding interrupt function to process the interrupt signal. In some embodiments, if the handshake request is configured to determine whether the host processor 120 has a program, operation, thread, process, instruction, etc. being executed, the host processor 120 may determine whether the host processor itself has a program, operation, thread, process, instruction being executed after receiving the handshake request.

In some embodiments, the host processor 120 may send (220) a response to the handshake request to the coprocessor 110 based on a result of the operation, for the coprocessor 110 to detect hardware crash associated with the operating system. In some embodiments, if the host processor 120 is unable to perform or complete the operation triggered by the handshake request, the host processor 120 may send no response to the coprocessor 110.

In some embodiments, if the handshake request is configured to trigger the host processor 120 to perform interrupt processing, the host processor 120 may send different responses to the coprocessor 110 based on whether the interrupt processing is successfully executed. For example, if the interrupt processing is successfully performed, the host processor 120 may send (220) a response indicating positive feedback (which is also known as a "positive response") to the coprocessor 110. If the interrupt processing is performed unsuccessfully, the host processor 120 may send, to the coprocessor 110, a response indicating negative feedback (which is also known as a "negative response") or no response. The positive response may be, for example, a predetermined answering signal, while the negative response may be a wrong answering signal different from the predetermined answering signal. For example, the answering signal may be a high-level signal, while the wrong answering signal may be a low-level signal. However, this is only an example, and the embodiments of the present disclosure are not limited in this regard. Whether the interrupt processing can be performed may reflect a state of the host processor more accurately. Therefore, in this embodiment, the accuracy of hardware crash detection can be further improved by triggering interrupt processing.

In some embodiments, if the handshake request is configured to determine whether the host processor 120 has a program, operation, thread, process, instruction, etc. being executed, the host processor 120 may determine the numbers of programs, operations, threads, processes, instructions, etc. being executed. If the number is greater than or equal to a threshold number (e.g., 1), the host processor 120 may send a positive response to the coprocessor 110. If the number is less than the threshold number, the host processor 120 may send, to the coprocessor 110, a negative response or no response.

In response to sending the handshake request, the coprocessor 110 monitors the response to the handshake request from the host processor 120. In some embodiments, in order to ensure the efficiency of crash detection, the coprocessor 110 may set a monitoring duration threshold. The coprocessor 110 starts timing after sending the handshake request to the host processor 120, and no longer monitors the response to the handshake request from the host processor 120 when a duration reaches a duration threshold. For example, in response to sending the handshake request, the coprocessor 110 may start a timer to monitor the response to the handshake request.

The coprocessor 110 determines (230) a detection result of hardware crash associated with the operating system at least based on a monitoring result of this response. That is, depending on whether a response is received and the specific content of the response, the hardware crash associated with the operating system may be detected.

If a positive response (e.g., an answering signal) is received, it may be determined that the host processor 120 is not in a crash state. This means that there may be at least one processor capable of running the operating system. Correspondingly, it may be determined that no hardware crash is detected.

If a negative response (e.g., a wrong answering signal) is received, it means that the host processor may be in the crash state. If the coprocessor 110 does not receive a response to the handshake request within a period of time, it also means that the host processor 120 may be in the crash state. For example, if no response to the handshake request is received after the timer configured to monitor the response has expired, it means that the host processor 120 may be in the crash state. In some embodiments, it may be further confirmed whether the host processor 120 is in the crash state, for example, as those described below with reference to FIG. 4. If the host processor 120 is confirmed to be in the crash state, depending on the number of host processors capable of running the operating system, different detection strategies may be used to determine a detection result of hardware crash, for example, as those described below with reference to FIG. 4 and FIG. 6.

The overall process of detecting hardware crash using a handshake between the host processor and the coprocessor is described above with reference to FIG. 2. The following describes the detection strategies for different numbers of host processors.

Handshake Mechanism for a Single Host Processor

Figure 3:
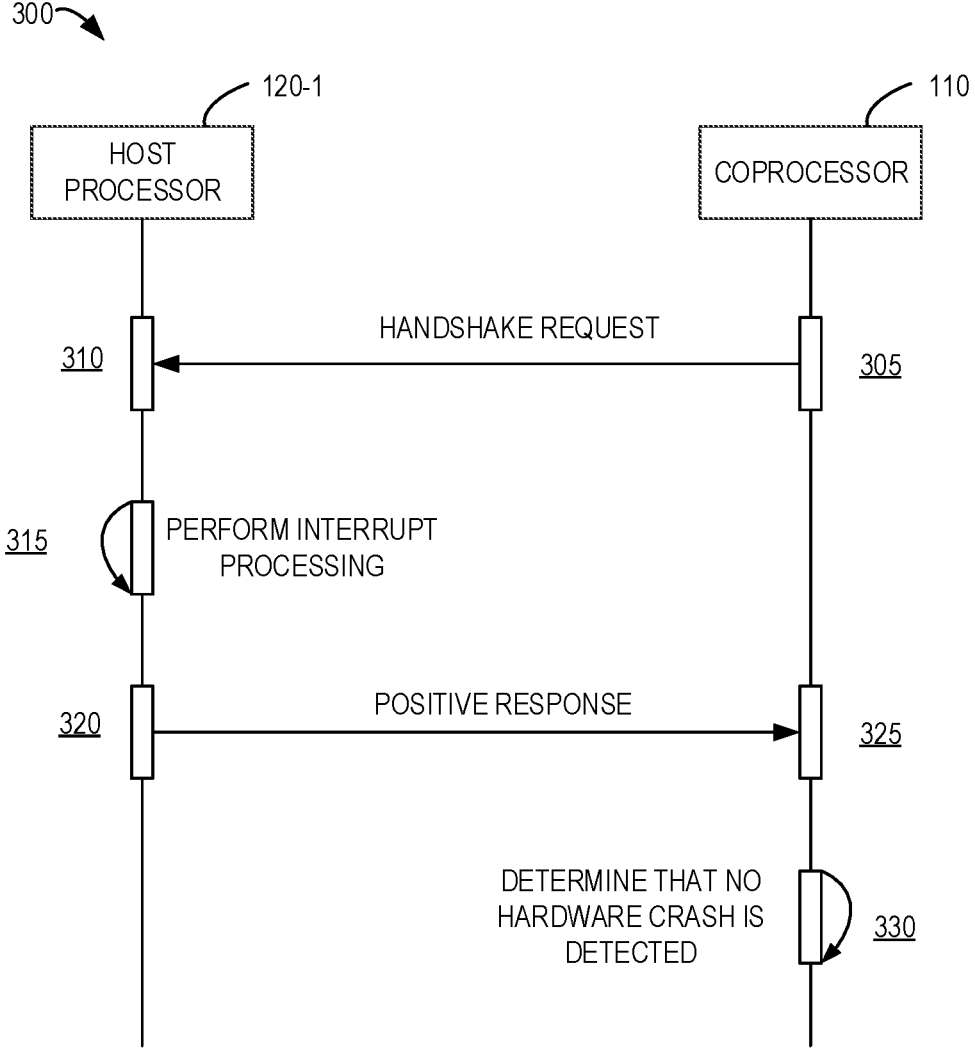
FIG. 3 illustrates a schematic diagram of an example signaling stream of hardware crash detection for a single host processor according to some embodiments of the present disclosure.

In some embodiments, a single host processor capable of running the operating system may exist. In such an embodiment, the crash of this host processor causes the crash of the operating system. FIG. 3 illustrates a schematic diagram of an example signaling stream 300 of hardware crash detection for a single host processor according to some embodiments of the present disclosure. As an example, the signaling stream 300 involves a coprocessor 110 and one host processor 120-1 in an environment 100. In this example, N=1, i.e., only the host processor 120-1 can run the operating system. This example shown in FIG. 3 is described by taking a handshake request triggering an interrupt operation as an example, that is, the handshake request may be an interrupt signal. However, this is only exemplary and applies to other types of operations triggered by the handshake request.

In the signaling stream 300, the coprocessor 110 sends (305) a handshake request to the host processor 120-1, and the handshake request in this example may be an interrupt signal. In response to sending the handshake request, the coprocessor 110 may monitor a response to this handshake request.

The host processor 120-1 receives (310) this handshake request and performs (315) interrupt processing as indicated by this handshake request. For example, after receiving the handshake request, the host processor 120-1 enters a corresponding interrupt processing function. In this example, the host processor 120-1 successfully performs interrupt processing. Correspondingly, the host processor 120-1 sends (320) a positive response, such as a predetermined answering signal, to the coprocessor 110.

The coprocessor 110 receives (325) the positive response. In view of receiving the positive response, the coprocessor 110 determines that the host processor 120-1 is not in a crash state. Since the host processor 120-1 has an ability to run the operating system, the coprocessor 110 determines (330) that no hardware crash is detected.

The case of the positive response is described above. As briefly mentioned with reference to FIG. 2 above, if the coprocessor 110 receives a negative response or does not receive any response within a period of time (e.g., before the timer expires), it may be determined that the host processor 120 may be in the crash state.

In some embodiments, to further ensure the accuracy of the detection result, the coprocessor 110 may resend a handshake request to the host processor 120. The coprocessor 110 may then monitor a response (also known as a second response) to this handshake request from the host processor 120. The detection result of hardware crash is further determined based on a monitoring result of the second response.

If the second response is a positive response, it may be determined that the host processor 120 is not in the crash state, and thus no hardware crash occurs. If the second response is a negative response or no second response is received within a period of time, it may be determined that the host processor 120 may be in the crash state. In the case that a single host processor 210 is capable of running an operating system, the coprocessor 110 may determine that hardware crash is detected based on the fact that the host processor 120 is in the crash state.

Figure 4:
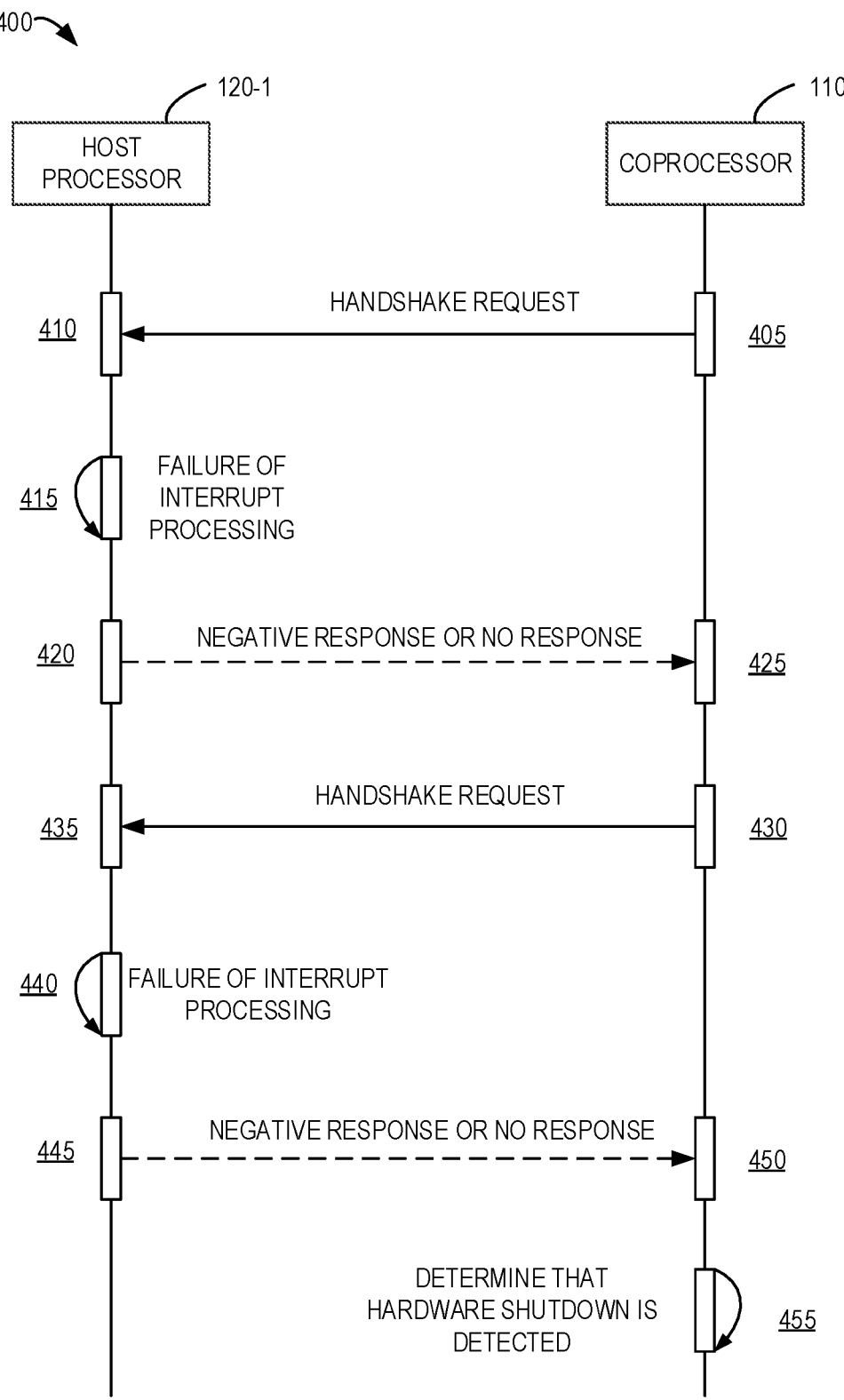
FIG. 4 illustrates a schematic diagram of another example signaling stream of hardware crash detection for a single host processor according to some embodiments of the present disclosure.

Such an example is described with reference to FIG. 4. FIG. 4 illustrates a schematic diagram of an signaling stream 400 of hardware crash detection for a single host processor according to some embodiments of the present disclosure. As an example, the signaling stream 400 involves a coprocessor 110 and one host processor 120-1 in an environment 100. In this example, N=1, i.e., only the host processor 120-1 can run the operating system. This example shown in FIG. 4 is described by taking a handshake request triggering an interrupt operation as an example, that is, the handshake request may be an interrupt signal. However, this is only exemplary and applies to other types of operations triggered by the handshake request.

In the signaling stream 400, the coprocessor 110 sends (405) a handshake request to the host processor 120-1, and the handshake request in this example may be an interrupt signal. In response to sending the handshake request, the coprocessor 110 may monitor a response to this handshake request.

The host processor 120-1 receives (410) this handshake request and performs interrupt processing as indicated by this handshake request. For example, after receiving the handshake request, the host processor 120-1 enters a corresponding interrupt processing function. In this example, the host processor 120-1 fails to perform interrupt processing (415), e.g., fails to interrupt jump or has a jump error. Correspondingly, the host processor 120-1 sends (420), to the coprocessor 110, a negative response and no response.

The coprocessor 110 receives (425) the negative response or does not monitor any response (e.g., no response shown in FIG. 4 in the event of waiting timeout). To confirm a state of the host processor, the coprocessor 110 resends (430) a handshake request to the host processor 120-1. The host processor 120-1 receives (435) this resent handshake request and performs interrupt processing as indicated by this handshake request. In this example, the host processor 120-1 fails to perform interrupt processing (440) again, e.g., fails to interrupt jump or has a jump error. Correspondingly, the host processor 120-1 sends (445), to the coprocessor 110, a negative response (such as a wrong answering signal) or no response.

The coprocessor 110 receives (450) the negative response or does not monitor any response (e.g., waiting timeout). In view of receiving the negative response again or response timeout, the coprocessor 110 may determine that the host processor 120-1 is in the crash state. Since the single host processor 120-1 is capable of running the operating system, the coprocessor 110 may determine (455) that hardware crash is detected.

Several embodiments that include one host processor 120-1 only may be described above in conjunction with FIG. 3 and FIG. 4.

Handshake Mechanism for a Plurality of Host Processors

In some embodiments, a plurality of host processors 120 may exist, and each of the host processors 120 has an ability to run an operating system. For example, with the continuous advancement of chip manufacturing techniques, there are more and more multiprocessor chips in the chip market, and each host processor in the multiprocessor chips is able to run the entire operating system independently.

In a scenario where the multiprocessor chip runs an operating system, crash of the operating system does not mean that all processors in the chip are in a crash state, and it is likely that some processors can still run system tasks stably. Therefore, although the software crash detection mentioned above can detect whether the operating system is running normally, a hardware crash state of the entire chip cannot be detected.

In contrast, in some embodiments of the present disclosure, a handshake mechanism between the host processor and the coprocessor is utilized to determine not only the overall hardware crash state, but also the crash state of each host processor.

In an embodiment in which a plurality of host processors is provided, the handshake mechanism of the coprocessor may also be adjusted accordingly. For example, one of the plurality of host processors may be designated to make a handshake with the coprocessor 110 to detect hardware crash. Such a host processor may also be referred to as a target processor. By still using an interrupt as an example, a multiprocessor chip may perform an interrupt processing task by using one of the host processors. When this host processor fails or is shut off, the interrupt processing task may be performed by another host processor. Correspondingly, the coprocessor 110 may make a handshake with the other host processor for hardware crash detection.

In some embodiments, if the host processor that is originally responsible for making a handshake with the coprocessor 110 is disabled and another host processor is responsible for the handshake instead, the coprocessor 110 may switch to sending a handshake request to that another host processor. The coprocessor 110 may further monitor a response to the handshake request from that another host processor and determine a detection result of hardware crash at least based on a monitoring result of this response.

Figure 5:
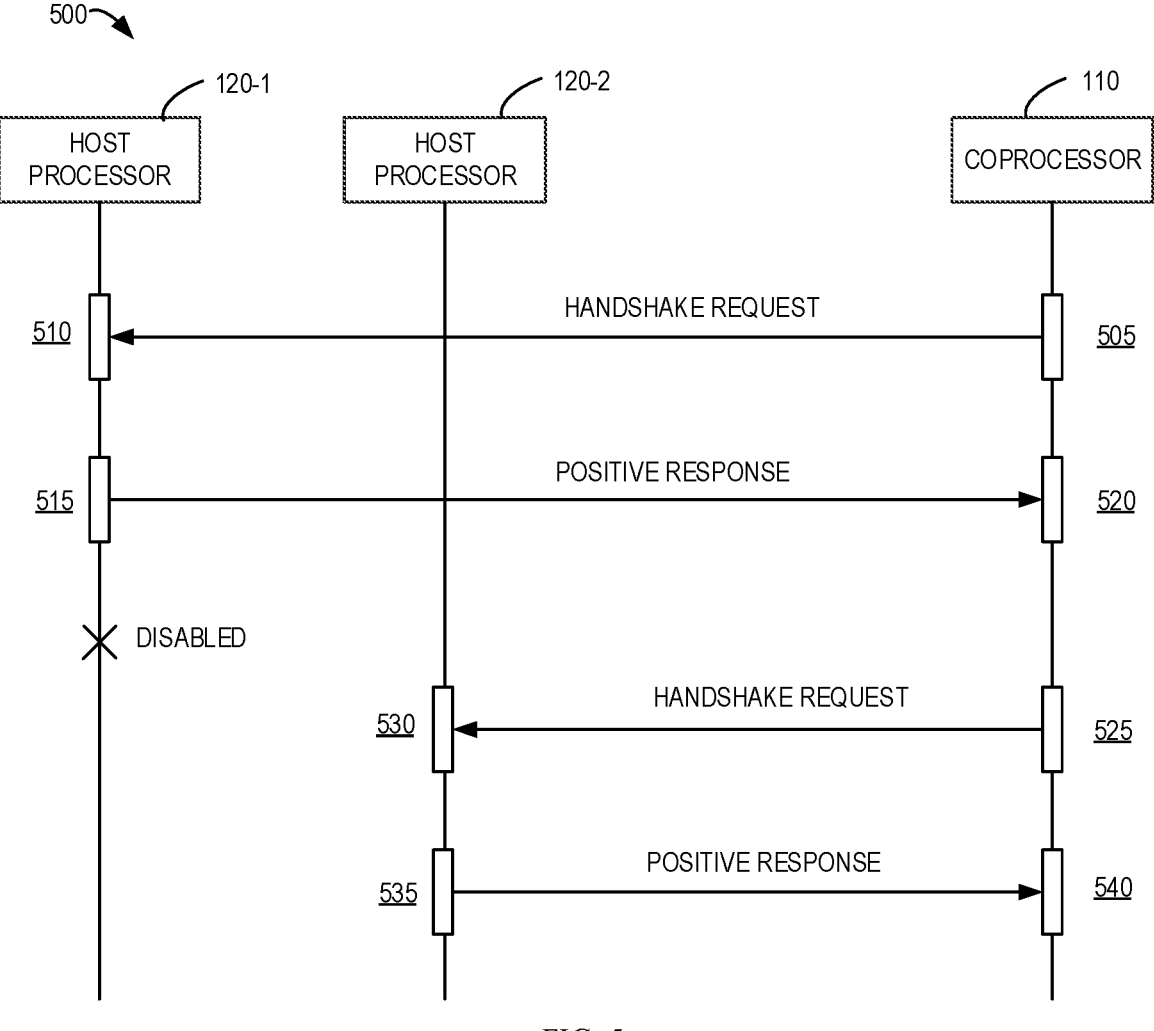
FIG. 5 illustrates a schematic diagram of an example signaling stream of hardware crash detection for a plurality of host processors according to some embodiments of the present disclosure.

Referring to FIG. 5, FIG. 5 illustrates a schematic diagram of an example signaling stream 500 of hardware crash detection for a plurality of host processors according to some embodiments of the present disclosure. The signaling stream 500 involves a coprocessor 110, a host processor 120-1 and a host processor 120-2 in an environment 100. In this example, N is greater than or equal to 2, i.e., at least two host processors can run an operating system. This example shown in FIG. 5 is described by taking a handshake request triggering an interrupt operation as an example, that is, the handshake request may be an interrupt signal. However, this is only exemplary and applies to other types of operations triggered by the handshake request.

In the signaling stream 500, initially, the host processor 120-1 is responsible for performing an interrupt processing task. The coprocessor 110 sends (505) a handshake request to the host processor 120-1. The host processor 120-1 receives (510) this handshake request and performs interrupt processing. In this example, interrupt processing is performed successfully. Accordingly, the host processor 120-1 sends (515) a positive response to the coprocessor 110. The coprocessor 110 receives (520) the positive response from the host processor 120-1, and thus may determine that the host processor 120-1 is not in a crash state. In this case, at least the host processor 120-1 is capable of running the operating system and thus no hardware crash occurs.

Subsequently, the host processor 120-1 is disabled and the interrupt processing task is migrated to the host processor 120-2. For example, the operating system shuts off the host processor 120-1 and the interrupt processing task is migrated to the host processor 120-2. Accordingly, the coprocessor 110 may switch to making a handshake with the host processor 120-2 for hardware crash detection. For example, with the presence of an interrupt controller, an identifier of the host processor for interrupt processing as stored in the interrupt controller may be set to an identifier of the host processor 120-2. Specifically, the coprocessor 110 sends (525) a handshake request to the host processor 120-2 and monitors a response to the handshake request from the host processor 120-2. The coprocessor 110 may determine whether the host processor 120-2 is in a crash state based on a monitoring result of this response, thereby performing hardware crash detection.

In an example in FIG. 5, the host processor 120-2 receives (530) this handshake request and performs interrupt processing. In the case that interrupt processing is performed successfully, the host processor 120-2 sends (535) a positive response to the coprocessor 110. The coprocessor 110 receives (540) this positive response, and thus determines that no hardware crash occurs. Subsequently, the coprocessor 110 continues to make a handshake with the host processor 120-2 for hardware crash detection.

An example process of switching a target host processor is described above. In the case of a plurality of processors, if the host processor that originally makes a handshake is in a crash state, the coprocessor 110 may actively switch the host processor for the handshake.

In some embodiments, if it is determined that the host processor 120-1 is in a crash state, the coprocessor 110 may send a handshake request to other host processors (e.g., the host processors 120-2 through 120-N) other than the host processor 120-1 to determine whether the other host processors are in a crash state. It may be determined that the hardware crash is detected if the other host processors 120 are in the crash state. If the coprocessor 110 receives a positive response from certain host processor (e.g., host processor 120-3), the coprocessor 110 may identify this host processor as the target host processor for handshake. Subsequently, the coprocessor 110 may make a handshake with this host processor for hardware crash detection.

In some embodiments, in order to avoid a plurality of target host processors from affecting program or operation running, the coprocessor 110 will no longer send the handshake request to other host processors after determining that certain host processor is not in a crash state. The coprocessor 110 will not continue to send the handshake request to other host processors until this processor is disabled or is in a crash state.

Figure 6:
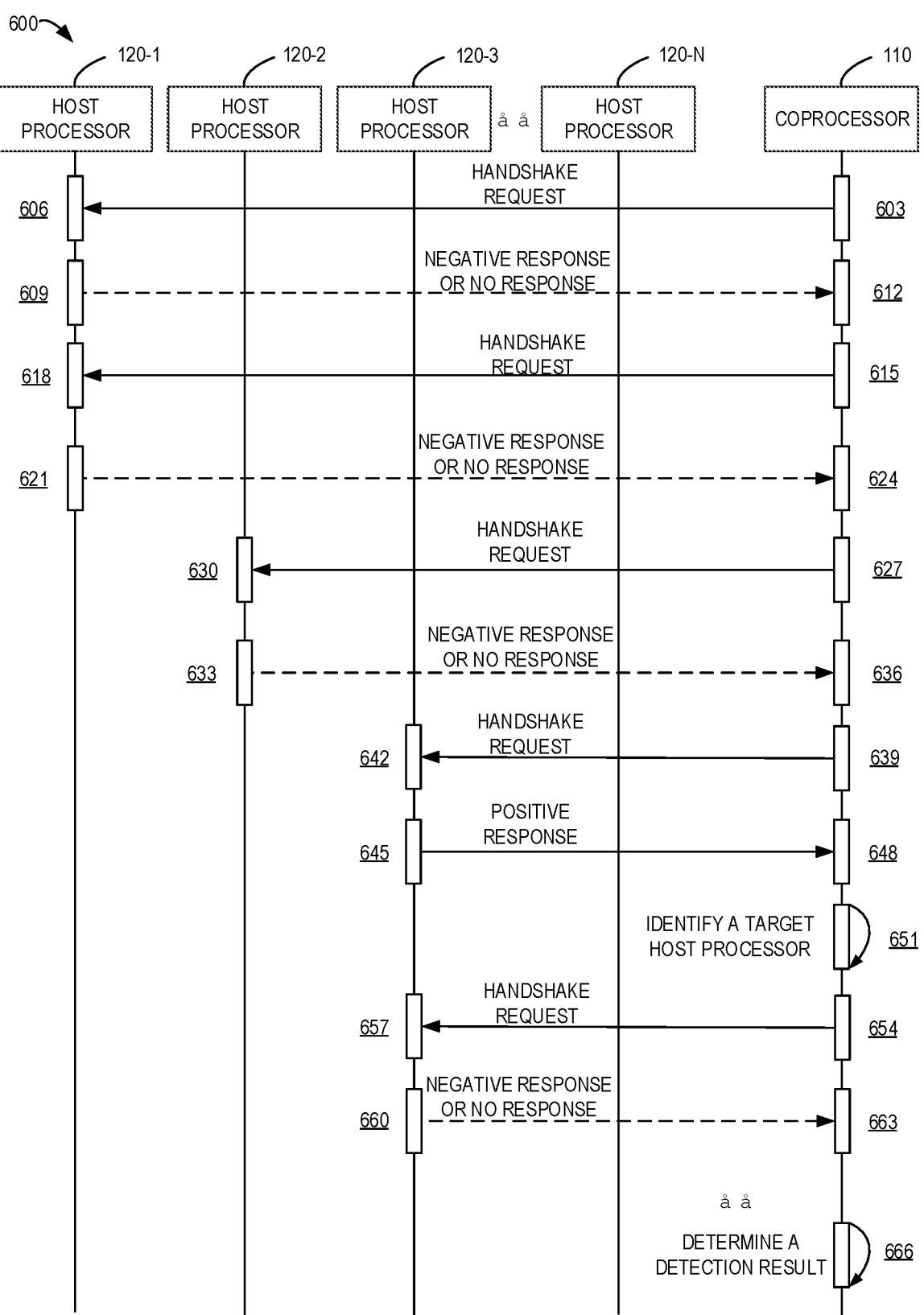
FIG. 6 illustrates a schematic diagram of another example signaling stream of hardware crash detection for a plurality of host processors according to some embodiments of the present disclosure.

An example is described with reference to FIG. 6. FIG. 6 illustrates a schematic diagram of another example signaling stream 600 of hardware crash detection for a plurality of host processors according to some embodiments of the present disclosure. The signaling stream 600 involves a coprocessor 110, and a host processor 120-1 to a host processor 120-N in an environment 100. The plurality of host processors 120 each has an ability to run an operating system.

In the signaling stream 600, the coprocessor 110 sends (603) a handshake request to the host processor 120-1. The host processor 120-1 receives (606) this handshake request and fails to perform interrupt processing. Correspondingly, the host processor 120-1 sends (609), to the coprocessor 110, a negative response or no response. The coprocessor 110 receives (612) the negative response or does not receive any response. To confirm a state of the host processor 120-1, the coprocessor 110 sends (615) a handshake request to the host processor 120-1. The host processor 120-1 receives (618) this handshake request and fails to perform interrupt processing. Correspondingly, the host processor 120-1 sends (621), to the coprocessor 110, a negative response or no response. The coprocessor 110 receives (324) the negative response or does not receive any response, and thus determines that the host processor 120-1 is in a crash state.

The coprocessor 110 automatically polls to make a handshake with other processors. As shown in FIG. 6, the coprocessor 110 sends (627) a handshake request to the host processor 120-2. The host processor 120-2 receives (630) this handshake request and fails to perform interrupt processing. Correspondingly, the host processor 120-2 sends (633), to the coprocessor 110, a negative response or no response. The coprocessor 110 receives (636) the negative response or does not receive any response, and thus may determine that the host processor 120-2 is in a crash state. In this embodiment, since it has been determined that the host processor 120-2 is in a crash state, the processor 120-2 may not be confirmed further, that is, no handshake request may be sent to the processor 120-2 again.

The coprocessor 110 continues to poll automatically. Specifically, the coprocessor 110 sends (639) a handshake request to the host processor 120-3. The host processor 120-3 receives (642) this handshake request and performs interrupt processing successfully. Correspondingly, the host processor 120-3 sends (645) a positive response to the coprocessor 110. The coprocessor 110 receives (648) the positive response, and thus may determine that the host processor 120-3 is not in a crash state. Accordingly, the coprocessor 110 identifies the host processor 120-3 (651) as a target host processor. For example, the coprocessor 110 may modify an identifier of the host processor for an interrupt processing task as stored in the interrupt controller to an identifier of the host processor 120-3.

Subsequently, the coprocessor 110 takes the host processor 120-3 as a target host processor for a handshake for hardware crash detection. In the subsequent detection process, the coprocessor 110 sends (654) a handshake request to the host processor 120-3. The host processor 120-3 receives (657) this handshake request and fails to perform interrupt processing. Correspondingly, the host processor 120-3 sends (660), to the coprocessor 110, a negative response or no response. The coprocessor 110 receives (663) the negative response or does not receive any response, and thus may determine that the host processor 120-3 is in a crash state. Accordingly, the coprocessor 110 cancels the identification of the host processor 120-3 as the target host processor and continues to automatically poll to send a handshake request to the remaining host processors.

If there is no positive response from the host processor during the polling process, it means that a plurality of host processors 120 is in a crash state. Correspondingly, the coprocessor 110 determines (666) a detection result of hardware crash associated with the operating system. The hardware crash is determined to occur in this example. For example, if no host processor responds to a handshake request sent from the coprocessor during an automatic polling handshake, all processors within the multiprocessor chip are considered to in the crash state, and the entire chip hardware is crashed.

In some embodiments, after determining the detection result, the coprocessor 110 may provide the detection result to the other processors so that the other processors can perform subsequent processing.

In the embodiments described above, in a case of a plurality of host processors, the coprocessor 110 will no longer send the handshake request to other host processors after determining that certain host processor is not in a crash state. However, this is not necessary. Alternatively, in some embodiments, in order to determine whether each of the plurality of host processors 120-1 is in a crash state, the coprocessor 110 may send a handshake request to all the host processors in sequence to determine respective states of the plurality of host processors 120, i.e., determine which host processor or processors is/are in a crash state and which host processor or processors is/are not in a crash state.

The hardware crash detection scheme according to the embodiments of the present disclosure can effectively and quickly identify the hardware crash of the processors, and in particular and can identify whether the entire chip is in a complete crash state in the application of the multiprocessor chip well to provide more comprehensive crash detection for pseudo crash of the operating system or software crash.

Example Processes

FIG. 7 illustrates a flowchart of a process 700 for crash detection according to some embodiments of the present disclosure. The process 700 may be implemented at the coprocessor 110. The process 700 is described below with reference to FIG. 1.

At block 710, the coprocessor 110 sends a first handshake request to a first host processor having an ability to run an operating system.

At block 720, the coprocessor 110 monitors a first response to the first handshake request from the first host processor.

At block 730, the coprocessor 110 determines a detection result of hardware crash associated with the operating system at least based on a monitoring result of the first response.

In some embodiments, determining the detection result comprises: in response to receiving the first response and the first response indicating positive feedback, determining that the hardware crash is not detected.

In some embodiments, determining the detection result comprises: resending the first handshake request to the first host processor in response to one of the followings: receiving the first response and the first response indicating negative feedback; or that the first response is not received within a period of time; and monitoring a second response to the resent first handshake request from the first processor; and determining that the first host processor is in a crash state in response to one of the followings: receiving the second response and the second response indicating negative feedback; or that the second response is not received within a period of time; and determining that the hardware crash is detected at least based on the first host processor being in the crash state.

In some embodiments, determining that the hardware crash is detected comprises: determining whether other host processors other than the first host processor of a plurality of host processors are in the crash state, the plurality of host processors each having an ability to run the operating system; and in response to determining that the other host processors are in the crash state, determining that the hardware crash is detected.

In some embodiments, determining whether the other host processors are in the crash state comprises: sending a second handshake request to a second host processor of the plurality of host processors, the second host processor being different from the first host processor; monitoring a third response to the second handshake request from the second host processor; and determining that the second host processor is in the crash state in response to one of the followings: receiving the third response and the third response indicating negative feedback; or that the third response is not received within a period of time.

In some embodiments, determining the detection result comprises: in response to determining that the first host processor is in a crash state based on the monitoring result, sending a third handshake request to a third processor different from the first host processor; in response to receiving a positive response to the third handshake request from the third processor, identifying the third processor as a target host processor for handshake; resending the third handshake request to the third processor; monitoring a fourth response to the resent third handshake request from the third processor; and determining the detection result further based on a monitoring result of the fourth response.

In some embodiments, the process 700 further comprises: in response to the first host processor being disabled, sending a fourth handshake request to a fourth host processor while disabling the sending of the first handshake request to the first host processor; monitoring a fifth response to the fourth handshake request from the fourth host processor; and determining the detection result at least based on a monitoring result of the fifth response.

In some embodiments, the first handshake request is configured to trigger the first host processor to perform interrupt processing.

FIG. 8 illustrates a flowchart of a process 800 for crash detection according to some embodiments of the present disclosure. The process 800 may be implemented at any of the host processors 120 as shown in FIG. 1. The process 800 is described below with reference to FIG. 1.

At block 810, a host processor 120 receives a handshake request from a coprocessor.

At block 820, the host processor 120 performs an operation triggered by the handshake request.

At block 830, a host processor 120 sends, based on a result of the operation, a response to the handshake request to the coprocessor for detecting hardware crash associated with the operating system.

In some embodiments, the handshake request is configured to trigger the host processor to perform interrupt processing, and sending the response comprises: in response to the interrupt processing being performed successfully, sending to the coprocessor a positive response indicating positive feedback; and in response to the interrupt processing being performed unsuccessfully, sending to the coprocessor a negative response indicating negative feedback.

Example Device

Figure 9:
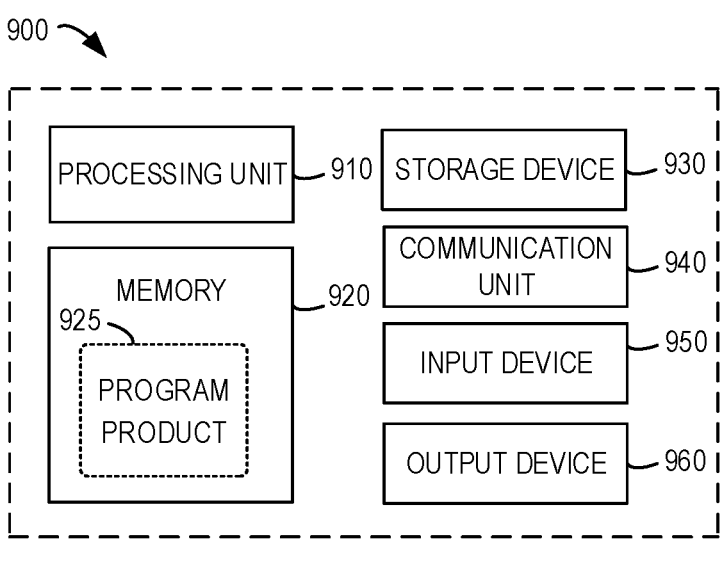
FIG. 9 is a block diagram of a device that may include a coprocessor and a host processor according to embodiments of the present disclosure.

FIG. 9 illustrates a block diagram of a computing device 900 which may include a coprocessor 110 and host processors 900 according to one or more embodiments of the present disclosure. It should be understood that the computing device 900 shown in FIG. 9 is merely exemplary and should not constitute any limitation on the functionality and scope of the embodiments described herein.

As shown in FIG. 9, the electronic device 900 is in the form of a general computing device. The components of electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes based on the programs stored in the memory 920. In a multiprocessor system, multiple processing units execute computer executable instructions in parallel to improve the parallel processing capability of the electronic device 900.

The electronic device 900 typically includes multiple computer storage medium. Such medium may be any available medium that is accessible to the electronic device 900, including but not limited to volatile and non-volatile medium, removable and non-removable medium. The memory 920 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 930 may be any removable or non-removable medium, and may include a machine readable medium such as a flash drive, a disk, or any other medium, which may be used to store information and/or data (such as training data for training) and may be accessed within the electronic device 900.

The electronic device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 920 may include a computer program product 925, which has one or more program units configured to perform various methods or acts of various implementations of the present disclosure.

The communication unit 940 communicates with a further electronic device through the communication medium. In addition, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other electronic devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

What is claimed is:

1. A coprocessor, comprising:
at least one circuit configured to:
  send a first handshake request to a first host processor having an ability to run an operating system, wherein the coprocessor and the first host processor are hardware components located in a same device;
  monitor a first response to the first handshake request from the first host processor; and
  determine a detection result of hardware crash associated with the operating system at least based on a monitoring result of the first response,
  wherein in accordance with the first handshake request being configured to trigger the first host processor to perform interrupt processing, the first host processor sends different responses to the coprocessor based on whether the interrupt processing is successfully executed, to reflect a state of the first host processor.

2. The coprocessor according to claim 1, wherein the at least one circuit is configured to determine the detection result by:
  in response to receiving the first response and the first response indicating positive feedback, determining that the hardware crash is not detected.

3. The coprocessor according to claim 1, wherein the at least one circuit is configured to determine the detection result by:
  resending the first handshake request to the first host processor in response to one of the followings:
    receiving the first response and the first response indicating negative feedback; or
    that the first response is not received within a period of time;
  monitoring a second response to the resent first handshake request from the first host processor;
  determining that the first host processor is in a crash state in response to one of the followings:

receiving the second response and the second response indicating negative feedback; or that the second response is not received within a period of time; and determining that the hardware crash is detected at least based on that the first host processor is in the crash state.

4. The coprocessor according to claim 3, wherein determining that the hardware crash is detected comprises:

determining whether other host processors other than the first host processor of a plurality of host processors are in the crash state, the plurality of host processors each having an ability to run the operating system; and in response to determining that the other host processors are in the crash state, determining that the hardware crash is detected.

5. The coprocessor according to claim 4, wherein determining whether the other host processors are in the crash state comprises:

sending a second handshake request to a second host processor of the plurality of host processors, the second host processor being different from the first host processor; and monitoring a third response to the second handshake request from the second host processor; and determining that the second host processor is in the crash state in response to one of the followings:

receiving the third response and the third response indicating negative feedback; or that the third response is not received within a period of time.

6. The coprocessor according to claim 1, wherein the at least one circuit is configured to determine the detection result by:

in response to determining that the first host processor is in the crash state based on the monitoring result, sending a third handshake request to a third processor different from the first host processor;

in response to receiving a positive response to the third handshake request from the third processor, identifying the third processor as a target host processor for handshake;

resending the third handshake request to the third processor;

monitoring a fourth response to the resent third handshake request from the third processor; and determining the detection result further based on a monitoring result of the fourth response.

7. The coprocessor according to claim 1, wherein the at least one circuit is further configured to:

in response to the first host processor being disabled, send a fourth handshake request to a fourth host processor while disabling the sending of the first handshake request to the first host processor;

monitor a fifth response to the fourth handshake request from the fourth host processor; and determine the detection result at least based on a monitoring result of the fifth response.

8. The coprocessor according to claim 1, wherein the at least one is further configured to:

in response to sending the handshake request, start a timer to monitor the first response to the first handshake request.

9. A host processor having an ability to run an operating system and comprising:

at least one circuit configured to:

receive a handshake request from a coprocessor, wherein the coprocessor and the host processor are hardware components located in a same device;

perform an operation triggered by the handshake request; and send, based on a result of the operation, a response to the handshake request to the coprocessor for detecting hardware crash associated with the operating system, wherein in accordance with the handshake request being configured to trigger the host processor to perform interrupt processing, the host processor sends different responses to the coprocessor based on whether the interrupt processing is successfully executed, to reflect a state of the host processor.

10. The host processor according to claim 9, wherein the handshake request is configured to trigger the host processor to perform interrupt processing, and the least one circuit is configured to send the response by:

in response to the interrupt processing being performed successfully, sending to the coprocessor a positive response indicating positive feedback; and in response to the interrupt processing being performed unsuccessfully, sending to the coprocessor a negative response indicating negative feedback.

11. A crash detection method, comprising:

sending, by a coprocessor, a first handshake request to a first host processor having an ability to run an operating system, wherein the coprocessor and the first host processor are hardware components located in a same device;

monitoring a first response to the first handshake request from the first host processor; and determining a detection result of hardware crash associated with the operating system at least based on a monitoring result of the first response, wherein in accordance with the first handshake request being configured to trigger the first host processor to perform interrupt processing, the first host processor sends different responses to the coprocessor based on whether the interrupt processing is successfully executed, to reflect a state of the first host processor.

12. The method according to claim 11, wherein determining the detection result comprises:

in response to receiving the first response and the first response indicating positive feedback, determining that the hardware crash is not detected.

13. The method according to claim 11, wherein determining the detection result comprises:

resending the first handshake request to the first host processor in response to one of the followings:

receiving the first response and the first response indicating negative feedback; or that the first response is not received within a period of time; and monitoring a second response to the resent first handshake request from the first host processor; and determining that the first host processor is in a crash state in response to one of the followings:

receiving the second response and the second response indicating negative feedback; or that the second response is not received within a period of time; and determining that the hardware crash is detected at least based on the first host processor being in the crash state.

14. The method according to claim 13, wherein determining that the hardware crash is detected comprises:

determining whether other host processors other than the first host processor of a plurality of host processors are in the crash state, the plurality of host processors each having an ability to run the operating system; and in response to determining that the other host processors are in the crash state, determining that the hardware crash is detected.

15. The method according to claim 14, wherein determining whether the other host processors are in the crash state comprises:

sending a second handshake request to a second host processor of the plurality of host processors, the second host processor being different from the first host processor;

monitoring a third response to the second handshake request from the second host processor; and determining that the second host processor is in the crash state in response to one of the followings:

receiving the third response and the third response indicating negative feedback; or that the third response is not received within a period of time.

16. The method according to claim 11, wherein determining the detection result comprises:

in response to determining that the first host processor is in a crash state based on the monitoring result, sending a third handshake request to a third processor different from the first host processor;

in response to receiving a positive response to the third handshake request from the third processor, identifying the third processor as a target host processor for handshake;

resending the third handshake request to the third processor;

monitoring a fourth response to the resent third handshake request from the third processor; and determining the detection result further based on a monitoring result of the fourth response.

17. The method according to claim 11, further comprising:

in response to the first host processor being disabled, sending a fourth handshake request to a fourth host processor while disabling the sending of the first handshake request to the first host processor;

monitoring a fifth response to the fourth handshake request from the fourth host processor; and determining the detection result at least based on a monitoring result of the fifth response.

18. The method according to claim 11, further comprising:

in response to sending the handshake request, starting a timer to monitor the first response to the first handshake request.

\* \* \* \* \*